US009151211B2

(12) United States Patent
Anilovich et al.

(10) Patent No.: US 9,151,211 B2
(45) Date of Patent: Oct. 6, 2015

(54) METHOD OF MONITORING AN ENGINE COOLANT SYSTEM OF A VEHICLE

(75) Inventors: Igor Anilovich, Walled Lake, MI (US); Daniel A. Bialas, Ann Arbor, MI (US); Morena Bruno, Turin (IT); Daniel Siebert, Mainz (DE); John W. Siekkinen, Novi, MI (US)

(73) Assignee: GM Global Technology Operations LLC, Detroit, MI (US)

(*) Notice: Subject to any disclaimer, the term of this patent is extended or adjusted under 35 U.S.C. 154(b) by 1306 days.

(21) Appl. No.: 12/987,471

(22) Filed: Jan. 10, 2011

(65) Prior Publication Data

US 2012/0179353 A1 Jul. 12, 2012

(51) Int. Cl.

| | |
|---|---|
| ***G06F 19/00*** | (2011.01) |
| ***G06G 7/70*** | (2006.01) |
| ***F01P 5/14*** | (2006.01) |
| ***F01P 11/16*** | (2006.01) |
| ***F02D 41/22*** | (2006.01) |

(52) U.S. Cl.

CPC ................. *F01P 11/16* (2013.01); *F02D 41/22* (2013.01); *F01P 2050/24* (2013.01)

USPC ........................................ 701/114; 123/41.15

(58) Field of Classification Search

CPC ... F01P 11/16; F01P 2025/30; F01P 2025/32; F02D 41/222

USPC .............. 73/114.68; 123/41.01, 41.02, 41.15, 123/198 D; 701/99, 101, 107, 114; 702/99

See application file for complete search history.

(56) References Cited

U.S. PATENT DOCUMENTS

| | | | | |
|---|---|---|---|---|
| 6,321,695 | B1 * | 11/2001 | Yoo et al. | 123/41.15 |
| 2002/0099482 | A1 * | 7/2002 | Reese et al. | 701/29 |
| 2002/0193921 | A1 * | 12/2002 | Reese et al. | 701/29 |
| 2010/0058848 | A1 | 3/2010 | Hamama et al. | |
| 2010/0095909 | A1 * | 4/2010 | Lin et al. | 123/41.02 |

FOREIGN PATENT DOCUMENTS

| | | | |
|---|---|---|---|
| DE | 102004053850 | A1 | 6/2006 |
| DE | 102008020933 | A1 | 12/2009 |

* cited by examiner

*Primary Examiner* — Mahmoud Gimie
*Assistant Examiner* — Sizo Vilakazi
(74) *Attorney, Agent, or Firm* — Quinn Law Group, PLLC

(57) ABSTRACT

A method of monitoring an engine coolant system includes modeling the total energy stored within an engine coolant. If an actual temperature of the engine coolant is below a minimum target temperature, the modeled total energy stored within the energy coolant is compared to a maximum stored energy limit to determine if sufficient energy exists within the engine coolant to heat the engine coolant to a temperature equal to or greater than the minimum target temperature. The engine coolant system fails the diagnostic check when the modeled total energy stored within the energy coolant is greater than the maximum stored energy limit, and the minimum target temperature has not been reached.

17 Claims, 1 Drawing Sheet

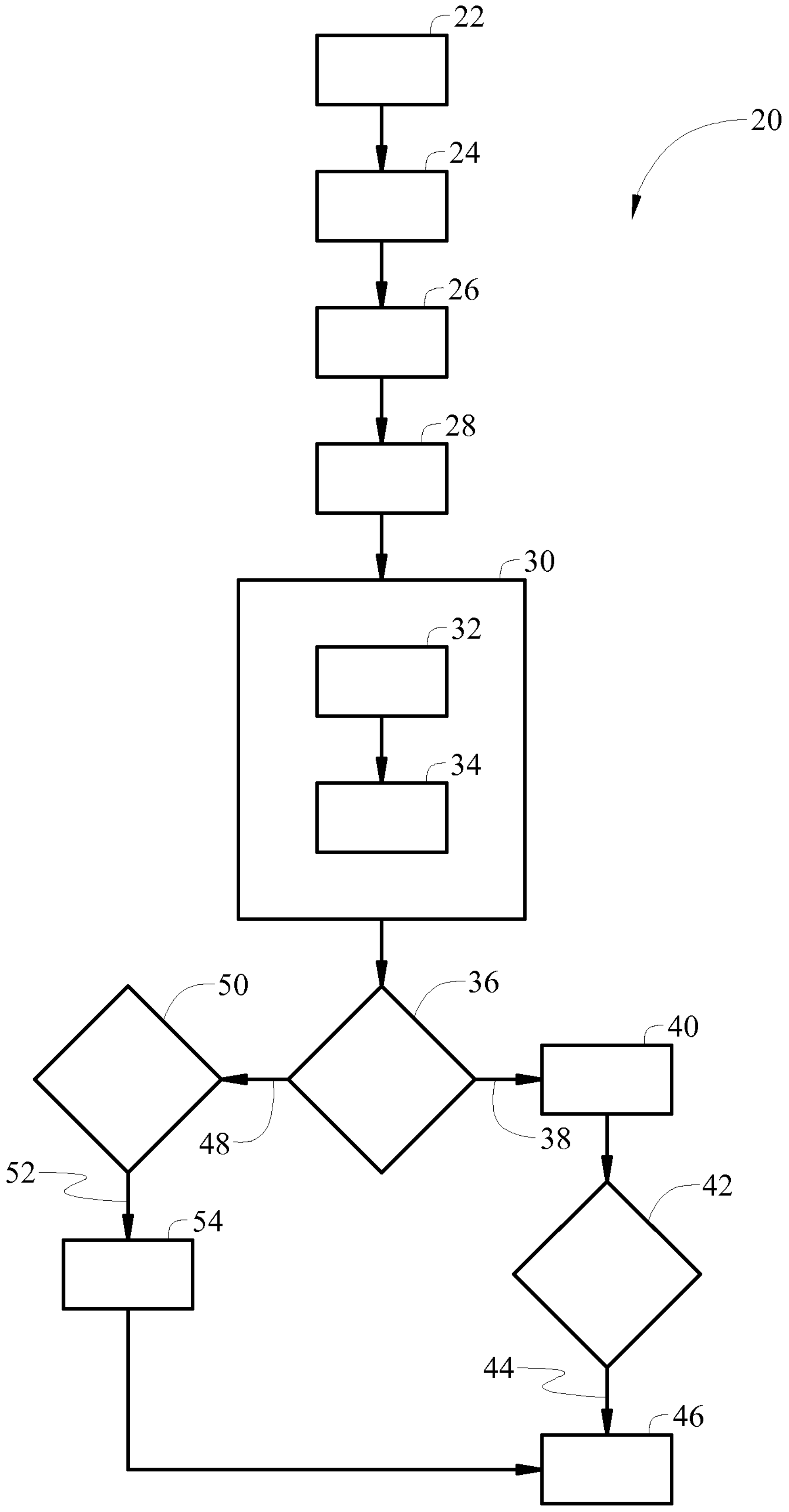
22
20
24
26
28
30
32
34
50
36
40
48
38
52
42
54
44
46

METHOD OF MONITORING AN ENGINE COOLANT SYSTEM OF A VEHICLE

TECHNICAL FIELD

The invention generally relates to a method of monitoring an engine coolant system of a vehicle.

BACKGROUND

The California Air Resources Board (CARB) mandates that vehicles powered by an internal combustion engine must include onboard diagnostic systems to monitor the operation of the engine and other components and/or systems related to the operation of the engine to ensure ongoing vehicle compliance with air quality standards.

One of the systems related to the operation of the engine that must be monitored is the engine coolant system. The engine operates most efficiently and produces the least amount of air pollutants when operating above a minimum target temperature. If the vehicle fails to reach the minimum target temperature, then one or more components of the engine coolant system may be malfunctioning or otherwise not operating at an optimum level. Accordingly, CARB mandates that the operation and/or performance of the engine coolant system must be monitored to verify continued proper operation.

In hybrid vehicles, the engine may not operate for a sufficient continuous time to complete a diagnostic check of the engine coolant system. For example, the engine may not operate during auto-stop events and/or engine Deceleration Fuel Cut Off (DFCO) event. Accordingly, the engine must be maintained in an engine running mode during the time required to complete the engine coolant system diagnostic check, thereby inhibiting hybrid vehicles from operating in an engine off mode, such as during an auto-stop event and/or a DFCO event, which reduces the fuel efficiency of the hybrid vehicle.

SUMMARY

A method of monitoring an engine coolant system of a vehicle is provided. The method includes modeling a total amount of energy stored within an engine coolant of the engine coolant system. An actual temperature of the engine coolant is compared to a minimum target temperature to determine if the actual temperature of the engine coolant is greater than the target temperature, equal to the target temperature or less than the target temperature. The method further includes reporting a system pass value when the actual temperature of the engine coolant is equal to or greater than the target temperature. The modeled total amount of energy stored within the engine coolant is compared to a maximum stored energy limit when the actual temperature of the engine coolant is less than the target temperature to determine if the modeled amount of energy stored within the engine coolant is greater than the maximum stored energy limit, equal to the maximum stored energy limit or less than the maximum stored energy limit. The method further includes reporting a system fail value when the modeled amount of energy stored within the engine coolant is equal to or greater than the maximum energy limit.

A method of monitoring an engine coolant system of a vehicle is also provided. The method includes collecting data related to the operation of the engine coolant system. The data collected includes at least one of data identifying when an engine is running, data identifying when the engine is not running, data regarding an amount of time the engine is running, data regarding an ambient air temperature, data regarding a minimum engine coolant temperature measured during this specific engine coolant system diagnostic check, data related to a power output of the engine, data related to a soak time of the engine coolant, data related to a speed of the vehicle, and data related to a cooling fan speed of the vehicle. The method further includes calculating power input into the engine coolant and power output from the engine coolant from the collected data. The power input into the engine coolant and the power output from the engine coolant are integrated over time to predict the total amount of energy stored within the engine coolant. An actual temperature of the engine coolant is compared to a minimum target temperature to determine if the actual temperature of the engine coolant is greater than the target temperature, equal to the target temperature or less than the target temperature. The method further includes reporting a system pass value when the actual temperature of the engine coolant is equal to or greater than the target temperature prior to the predicted total energy reaching a maximum energy limit. A numerator of an in-use performance ratio is incremented after the reporting of a system pass value when the predicted total amount of energy stored within the engine coolant is equal to or greater than the maximum stored energy limit. A system fail value is reported when the predicted amount of energy stored within the engine coolant is equal to or greater than the maximum energy limit prior to the actual temperature of the engine coolant reaching the target temperature. The method further includes incrementing a numerator of an in-use performance ratio upon the reporting of the system fail value.

Accordingly, the temperature of the engine coolant is modeled based upon total energy transferred to and/or from the engine coolant. When engine combustion is present, energy is added to the total energy stored within the engine coolant. When engine combustion is not present, such as when a hybrid is operating in an auto-stop mode or a Deceleration Fuel Cut Off mode, then energy is subtracted from the total energy stored within the engine coolant. The disclosed diagnostic method is therefore suitable for hybrid vehicles that frequently operate in an engine off mode when the engine is warming up. The model of the total energy stored within the engine coolant is used to determine if the temperature of the engine coolant should be above a minimum target temperature. If the actual temperature of the engine coolant is below the minimum target temperature and the modeled total energy stored within the engine coolant is greater than a maximum stored energy limit, indicating that sufficient energy is present within the engine coolant to warm the engine coolant to or above the minimum target temperature, then the diagnostic check may determine that the engine coolant system is not operating properly.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a flow chart of a method of monitoring an engine coolant system of a vehicle.

DETAILED DESCRIPTION

Referring to FIG. 1, a method of monitoring an engine coolant system of a vehicle is shown generally at 20. The engine coolant system may include any suitable coolant system for cooling an internal combustion engine of a vehicle. Typically, the engine coolant system includes an engine coolant that circulates through the engine, whereupon the engine coolant absorbs thermal energy in the form of heat from the engine to cool the engine. The engine coolant may then circulate through one or more heat exchangers, including but not limited to an engine radiator or an HVAC heating core, to remove the thermal energy, i.e., heat, from the engine coolant. A thermostat may be disposed between the engine and the radiator to control the flow of the engine coolant through the engine.

The method monitors the performance of the engine coolant system to identify potential problems with and/or malfunctions in one or more of the engine coolant system components, including but not limited to the thermostat or a temperature sensor, such as but not limited to an engine coolant temperature sensor. The performance of the engine coolant system is monitored to ensure that the engine coolant for the internal combustion engine of the vehicle warms up to a minimum target temperature. The engine operates most efficiently, and produces the least amount of pollutants when operating at or above the minimum target temperature. Furthermore, On-Board Diagnostic (OBD) monitors of other vehicle systems (aside from the cooling system) may require a minimum coolant temperature in order to enable. Therefore, a malfunctioning cooling system could prevent other OBD monitors form activating. Accordingly, it is important to quickly and accurately identify malfunctions in the engine coolant system that may prevent the engine coolant, and thereby the engine, from reaching the minimum target temperature. For example, if the thermostat is stuck open, then excessive engine coolant may circulate through the radiator, causing undesirable heat loss and preventing the engine coolant from warming up to the minimum target temperature.

The method includes enabling an engine coolant system diagnostic test, indicated by block 22. The engine coolant system diagnostic test may be embodied as an algorithm operable on a controller of the vehicle. Upon the vehicle being initially turned on, whereupon the engine coolant and the engine may be at an ambient air temperature, the controller may initiate the engine coolant system diagnostic test to verify proper operation and/or functionality of the engine coolant system. The engine coolant system diagnostic test may operate only once for each vehicle trip.

The method further includes measuring an actual temperature of the engine coolant, indicated by block 24. The actual temperature of the engine coolant may be measured, for example, with a temperature sensor. However, the actual temperature of the engine coolant may be measured or calculated in some other manner not described herein. Accordingly, the scope of the disclosed method is not limited to measuring the actual temperature with a temperature sensor.

The method may further include defining the minimum target temperature of the engine coolant, indicated by block 26. The minimum target temperature of the engine coolant is the temperature above which the engine operates most efficiently and produces the least amount of pollution, and may be explicitly defined by a regulatory body like CARB. For example, CARB legislation may require that the minimum target temperature be set eleven degrees Celsius (11° C.) below the normal thermostat opening temperature. Since the thermostat opening temperature may vary with the specific engine design and configuration, the minimum target temperature will therefore vary among different vehicles and engine configurations. For example, if the thermostat designed to open fluid communication between the radiator and the engine at a temperature of ninety one degrees Celsius, then the minimum target temperature may be set to equal eighty degrees Celsius.

The method further includes defining a maximum stored energy limit of the engine coolant, indicated by block 28. The maximum stored energy limit of the engine coolant is the amount of thermal energy stored within the energy coolant that should theoretically be sufficient to heat the engine coolant to a temperature equal to or greater than the minimum target temperature. Accordingly, a value of stored energy within the engine coolant that is greater than the maximum stored energy limit would indicate that enough thermal energy has been added to the engine coolant to heat the engine coolant to a temperature that is greater than the minimum target temperature. Similarly, a value of stored energy within the engine coolant that is less than the maximum stored energy limit would indicate that the thermal energy that has been added to the engine coolant is not sufficient to heat the engine coolant to a temperature that is greater than the minimum target temperature.

The method further includes modeling a total amount of energy stored within the engine coolant of the engine coolant system, indicated by block 30. The model is used to predict how much thermal energy has accumulated in the engine coolant over time. Accordingly, if the vehicle includes a hybrid vehicle, then the model must account for and model the total amount of energy stored within the engine coolant when the engine is operating in one of an engine running mode, an engine auto-stop mode and a Deceleration Fuel Cut Off (DFCO) mode. Therefore, the model of the amount of energy stored within the engine coolant must account for thermal energy input into the engine coolant when the engine is running, thermal energy output from the engine coolant when the engine is running, and thermal energy output from the engine coolant when the engine is not running.

Modeling the total amount of energy stored within the engine coolant includes collecting data related to the operation of the engine coolant system, indicated by block 32. The engine coolant diagnostic test algorithm uses the data collected to model the amount of thermal energy stored within the engine coolant. Collecting data related to the operation of the engine coolant system may include but is not limited to collecting data identifying when the engine is running, data identifying when the engine is not running, data on an amount of time the engine is and has been running for, data on an ambient air temperature, data on a minimum engine coolant temperature measured during this specific engine coolant system diagnostic test, data related to a power output of the engine, data related to a soak time of the engine coolant, data related to a speed of the vehicle, and data related to a cooling fan speed of the vehicle. It should be appreciated that other forms of data may also be collected, and that not all of the specific forms of data described above need be collected, i.e., the diagnostic algorithm may use one or more of the above described forms of data, but may not need or use all of the above described forms of data. The data may be directly collected from specific sensors, or may alternatively be collected through data sharing with other control algorithms and/or modules of the vehicle.

Modeling the total amount of energy stored within the engine coolant may include integrating the power input into the engine coolant over time and the power output from the engine coolant over time to predict the total amount of energy stored within the engine coolant, indicated by block 34. The power input into the engine coolant may come from any source of energy in contact with the engine coolant. For example, the power input into the engine coolant may include power input from combustion within the engine when the engine is running, and may further include combustion within the engine after the engine has been turned off, commonly referred to as engine after-running The power input into the engine coolant from combustion within the engine is a function of the power output of the engine. As such, the more power the engine outputs, the more thermal energy is created through combustion within the engine, which is transferred to the engine coolant. The engine coolant system diagnostic algorithm may solve an equation relating the power output of the engine to the energy input into the engine coolant system. Accordingly, the energy input into the engine coolant system is added to the total amount of energy stored within the engine coolant.

The power output (loss) from the engine coolant includes power lost through heat exchange with the ambient air, power lost through heat exchange with vehicle cabin air, and power lost during Deceleration Fuel Cut Off (DFCO). The power lost through heat exchange with the ambient air is a function of a difference between the actual engine coolant temperature and the ambient air temperature, the velocity of the vehicle and the speed of a cooling fan that draws air across the radiator. The engine coolant system diagnostic algorithm may solve an equation relating the difference between the actual engine coolant temperature and the ambient air temperature, the velocity of the vehicle and the speed of a cooling fan to the power, i.e., thermal energy, lost through heat exchange with the ambient air. As such, the more power lost or dissipated through heat exchange with the ambient air, the more thermal energy is transferred from the engine coolant. Therefore, the energy power lost or dissipated through heat exchange with the ambient air is subtracted from the total amount of energy stored within the engine coolant.

The power lost through heat exchange with the cabin air is a function of a difference between the actual engine coolant temperature and the ambient air temperature within the vehicle cabin. The engine coolant system diagnostic algorithm may solve an equation relating the difference between the actual engine coolant temperature and the ambient air temperature within the temperature to the power, i.e., thermal energy, lost through heat exchange with the cabin air. As such, the more power lost or dissipated through heat exchange with the cabin air, the more thermal energy is transferred from the engine coolant. Therefore, the energy lost or dissipated through heat exchange with the cabin air is subtracted from the total amount of energy stored within the engine coolant.

The power lost through DFCO is a function of the mass air flow. The engine coolant system diagnostic algorithm may solve an equation relating the mass air flow to the power, i.e., thermal energy, lost through DFCO. As such, the more power lost or dissipated through DFCO, the more thermal energy is transferred from the engine coolant. Therefore, the energy lost or dissipated through DFCO is subtracted from the total amount of energy stored within the engine coolant.

The method further includes comparing an actual temperature of the engine coolant to the minimum target temperature. The actual temperature of the engine coolant is compared to the minimum target temperature to determine if the actual temperature of the engine coolant is greater than the target temperature, equal to the target temperature or less than the target temperature, indicated by block 36. If the actual temperature of the engine coolant is equal to or greater than the target temperature, indicated at 38, then the method further includes reporting a system pass value, indicated by block 40.

Upon the reporting of the system pass value, the method further includes comparing the modeled or predicted total amount of energy stored within the engine coolant to the maximum stored energy limit, indicated by block 42. The modeled total amount of energy stored within the engine coolant is compared to the maximum stored energy limit to determine if the modeled amount of energy stored within the engine coolant is greater than the maximum stored energy limit, equal to the maximum stored energy limit or less than the maximum stored energy limit. A successful completion of the engine coolant system diagnostic test is identified when the modeled total amount of energy stored within the engine coolant is equal to or greater than the maximum stored energy limit and the system pass value has been reported. Therefore, upon the reporting of the system pass value and the modeled total amount of energy stored within the engine coolant is equal to or greater than the maximum stored energy limit, indicated by block 44, then the method further includes incrementing a numerator of an N/D in-use performance ratio.

In order to track the performance of the engine coolant system diagnostics, verify that the engine coolant system is in fact being tested, and that the engine coolant system diagnostics are completing their tests, each vehicle includes a control algorithm that tracks a ratio of the number of times the engine coolant system diagnostic test is successfully completed to the number of times minimum criteria are met, sometimes referred to as "Standard Conditions Met" (SCM) criteria. This may be referred to as the "N/D in-use performance ratio". Every time the SCM criteria are satisfied, the denominator "D" is incremented. Every time the engine coolant system diagnostic test system successfully completes, or time sufficient to identify a failing diagnostic check has passed, the numerator "N" is incremented. The N/D in-use performance ratio must remain over a pre-defined level to ensure proper functioning of the engine coolant system diagnostic test and satisfy the CARB requirements. For example, the N/D ratio for each the engine coolant system diagnostic test typically must remain over 0.333 to satisfy the CARB requirements.

When the actual temperature of the engine coolant is less than the target temperature, indicated at 48, then the method further includes comparing the modeled or predicted total amount of energy stored within the engine coolant to the maximum stored energy limit, indicated by block 50. The modeled total amount of energy stored within the energy coolant is compared to the maximum stored energy limit to determine if the modeled amount of energy stored within the engine coolant is greater than the maximum stored energy limit, equal to the maximum stored energy limit or less than the maximum stored energy limit.

When the modeled amount of energy stored within the engine coolant is equal to or greater than the maximum energy limit, indicated at 52, the method further includes reporting a system fail value, indicated by block 54. If the total amount of thermal energy stored within the engine coolant, as predicted from the model, is equal to or greater than the maximum energy storage limit, it is presumed that something within the energy coolant system is malfunctioning because sufficient thermal energy has been added to engine coolant to warm the engine coolant to or above the minimum target temperature. As such, if the actual temperature of the engine coolant is below the minimum target temperature, yet the modeled or predicted total amount of thermal energy stored within the engine coolant is greater than the maximum energy storage limit, i.e., sufficient energy should exist within the engine coolant to warm the engine coolant to or above the minimum target temperature, then the diagnostic algorithm may report that the engine coolant system has failed the diagnostic test, and may not be operating properly. The above described method allows the diagnostic test to monitor the operation of the engine coolant system for hybrid vehicles, in which the engine is often turned off during an engine warm up period for auto-stop events and/or DFCO events, without having to force the engine to remain running in order to complete the engine coolant system diagnostic test.

The system fail value represents a successful completion of the engine coolant system diagnostic test. Accordingly, upon the reporting of the system fail value, the method further includes incrementing the numerator of the N/D in-use performance ratio described above, indicated by block 46.

While the best modes for carrying out the invention have been described in detail, those familiar with the art to which this invention relates will recognize various alternative designs and embodiments for practicing the invention within the scope of the appended claims.

The invention claimed is:

1. A method of monitoring an engine coolant system of a vehicle, the method comprising:

- circulating an engine coolant through the engine coolant system, including an engine operable to generate heat that the engine coolant absorbs to cool the engine, a heat exchanger operable to remove heat from the engine coolant, a thermostat disposed within the coolant system between the heat exchanger and the engine and operable to control the flow of the engine coolant through the engine, and a temperature sensor operable for sensing a current temperature of the engine coolant;
- modeling a total amount of energy stored within the engine coolant of the engine coolant system;
- measuring an actual temperature of the engine coolant circulating through the engine coolant system with the temperature sensor;
- comparing an actual temperature of the engine coolant to a minimum target temperature, with an engine coolant diagnostic test algorithm executed by an engine controller to determine if the actual temperature of the engine coolant is greater than the target temperature, equal to the target temperature or less than the target temperature;
- reporting a system pass value, with the engine coolant diagnostic test algorithm executed by the engine controller when the actual temperature of the engine coolant is equal to or greater than the target temperature;
- comparing the modeled total amount of energy stored within the engine coolant to a maximum stored energy limit, with the engine coolant diagnostic test algorithm executed by the engine controller when the actual temperature of the engine coolant is less than the target temperature to determine if the modeled amount of energy stored within the engine coolant is greater than the maximum stored energy limit, equal to the maximum stored energy limit or less than the maximum stored energy limit; and
- reporting a system fail value, with the engine coolant diagnostic test algorithm executed by the engine controller when the modeled amount of energy stored within the engine coolant is equal to or greater than the maximum energy limit.

2. A method as set forth in claim 1 wherein modeling the total amount of energy stored within the engine coolant includes collecting data related to the operation of the engine coolant system from sensors of the vehicle.

3. A method as set forth in claim 2 wherein collecting data related to the operation of the engine coolant system includes at least one of data identifying when an engine is running, data identifying when the engine is not running, data regarding an amount of time the engine is running, data regarding an ambient air temperature, data regarding a minimum engine coolant temperature measured during this specific engine coolant system diagnostic check, data related to a power output of the engine, data related to a soak time of the engine coolant, data related to a speed of the vehicle, and data related to a cooling fan speed of the vehicle.

4. A method as set forth in claim 3 wherein modeling the total amount of energy stored within the engine coolant includes integrating a power input into the engine coolant and a power output from the engine coolant over time, with the engine coolant diagnostic test algorithm executed by the engine controller to predict the total amount of energy stored within the engine coolant.

5. A method as set forth in claim 4 wherein the power input into the engine coolant includes power input from combustion when the engine is running, and power input from combustion when the engine is after-running.

6. A method as set forth in claim 5 wherein the power input from combustion when the engine is running is a function of the power output of the engine.

7. A method as set forth in claim 5 wherein the power input from combustion when the engine is after-running is a function of the power output of the engine.

8. A method as set for in claim 4 wherein the power output from the engine coolant includes power lost through heat exchange with the ambient air, power lost through heat exchange with vehicle cabin air, power lost to deceleration fuel cut off.

9. A method as set forth in claim 8 wherein the power lost through heat exchange with the ambient air is a function of a difference between the actual engine coolant temperature and the ambient air temperature, the velocity of the vehicle and the speed of the cooling fan.

10. A method as set forth in claim 8 wherein the power lost through heat exchange with vehicle cabin air is a function of difference between the actual engine coolant temperature and the ambient air temperature.

11. A method as set forth in claim 8 wherein the power lost to deceleration fuel cut off is a function of mass air flow.

12. A method as set forth in claim 1 wherein modeling a total amount of energy stored within the engine coolant includes modeling the total amount of energy stored within the engine coolant when an engine is operating in one of an engine running mode, an engine auto-stop mode and a deceleration fuel cut off mode.

13. A method as set forth in claim 1 further comprising incrementing a numerator of an in-use performance ratio, maintained by the engine controller upon the reporting of the system fail value.

14. A method as set forth in claim 1 further comprising comparing the modeled total amount of energy stored within the engine coolant to the maximum stored energy limit upon the reporting of the system pass value, with the engine coolant diagnostic test algorithm executed by the engine controller to determine if the modeled amount of energy stored within the engine coolant is greater than the maximum stored energy limit, equal to the maximum stored energy limit or less than the maximum stored energy limit.

15. A method as set forth in claim 14 further comprising incrementing a numerator of an in-use performance ratio, with the engine coolant diagnostic test algorithm executed by the engine controller when the modeled total amount of energy stored within the engine coolant is equal to or greater than the maximums stored energy limit.

16. A method as set forth in claim 1 further comprising enabling the engine coolant system diagnostic test algorithm with the engine controller.

17. A method of monitoring an engine coolant system of a vehicle, the method comprising:

circulating an engine coolant through the engine coolant system, including an engine operable to generate heat that the engine coolant absorbs to cool the engine, a heat exchanger operable to remove heat from the engine coolant, a thermostat disposed within the coolant system between the heat exchanger and the engine and operable to control the flow of the engine coolant through the engine, and a temperature sensor operable for sensing a current temperature of the engine coolant;

collecting data related to the operation of the engine coolant system, with sensors of the vehicle, including at least one of data identifying when an engine is running, data identifying when the engine is not running, data regarding an amount of time the engine is running, data regarding an ambient air temperature, data regarding a minimum engine coolant temperature measured during this specific engine coolant system diagnostic check, data related to a power output of the engine, data related to a soak time of the engine coolant, data related to a speed of the vehicle, and data related to a cooling fan speed of the vehicle;

calculating power input into the engine coolant and power output from the engine coolant from the collected data, with an engine coolant diagnostic test algorithm executed by an engine controller;

integrating the power input into the engine coolant and the power output from the engine coolant over time, with the engine coolant diagnostic test algorithm executed by the engine controller to predict the total amount of energy stored within the engine coolant;

measuring an actual temperature of the engine coolant circulating through the engine coolant system with the temperature sensor;

comparing the actual temperature of the engine coolant to a minimum target temperature, with the engine coolant diagnostic test algorithm executed by the engine controller to determine if the actual temperature of the engine coolant is greater than the target temperature, equal to the target temperature or less than the target temperature;

reporting a system pass value, with the engine coolant diagnostic test algorithm executed by the engine controller when the actual temperature of the engine coolant is equal to or greater than the target temperature prior to the predicted total energy reaching a maximum energy limit;

incrementing a numerator of an in-use performance ratio after the reporting of the system pass value, with the engine coolant diagnostic test algorithm executed by the engine controller when the predicted total amount of energy stored within the engine coolant is equal to or greater than the maximum stored energy limit;

reporting a system fail value, with the engine coolant diagnostic test algorithm executed by the engine controller when the predicted amount of energy stored within the engine coolant is equal to or greater than the maximum energy limit prior to the actual temperature of the engine coolant reaching the target temperature; and incrementing a numerator of an in-use performance ratio, with the engine coolant diagnostic test algorithm executed by the engine controller upon the reporting of a system fail value.

* * * * *